United States Patent
Guan et al.

(10) Patent No.: US 8,542,500 B2
(45) Date of Patent: Sep. 24, 2013

(54) RESONANT POWER CONVERTING CIRCUIT

(75) Inventors: Yeh Guan, Taipei County (TW);
Chih-Tai Chen, Taipei County (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 178 days.

(21) Appl. No.: 12/902,293

(22) Filed: Oct. 12, 2010

(65) Prior Publication Data

US 2011/0305045 A1  Dec. 15, 2011

(30) Foreign Application Priority Data

Jun. 9, 2010  (CN) .......................... 2010 1 0195740

(51) Int. Cl.
*H02M 3/335* (2006.01)

(52) U.S. Cl.
USPC ................ 363/21.02; 363/21.09; 363/21.17

(58) Field of Classification Search
USPC .......... 363/21.02, 21.03, 21.09, 21.11, 21.17, 363/21.18, 97
See application file for complete search history.

(56) References Cited

U.S. PATENT DOCUMENTS

| | | | | |
|---|---|---|---|---|
| 6,324,081 B1* | 11/2001 | Sakamoto et al. | ............... | 363/25 |
| 6,437,994 B1* | 8/2002 | Blom et al. | .................... | 363/16 |
| 7,187,139 B2* | 3/2007 | Jin | ................ | 315/274 |
| 8,369,108 B2* | 2/2013 | Guan et al. | ..................... | 363/16 |
| 2009/0196080 A1* | 8/2009 | Zhang et al. | ................... | 363/74 |
| 2009/0273325 A1* | 11/2009 | Nakahashi et al. | ........... | 323/282 |
| 2011/0149612 A1* | 6/2011 | Yeh | .......................... | 363/21.09 |

* cited by examiner

*Primary Examiner* — Gary L Laxton
*Assistant Examiner* — Alex Torres-Rivera
(74) *Attorney, Agent, or Firm* — Li&Cai Intellectual Property (USA) Office

(57) ABSTRACT

A resonant power converting circuit is provided, which includes a resonant converting unit, a control unit, a current detecting unit and a frequency modulation unit. The control unit outputs switching signals to the resonant converting unit to adjust an output thereof. The current detecting unit is configured to detect an output current of the resonant converting unit. The frequency modulation unit may adjust a lowest switching frequency of the control unit according to the detected output current so as to increase a gain of the resonant converting unit and an output stability of the resonant converting unit.

10 Claims, 5 Drawing Sheets

RESONANT POWER CONVERTING CIRCUIT

BACKGROUND OF THE INVENTION

1. Field of the Invention

The present invention relates to a power convertor, and more particularly, to a resonant power converting circuit.

2. Description of Related Art

Because of the environmental protection awareness and the global warming issues, power consumption has been one of the heavily discussed topics in many places. U.S. Environmental Protection Agency, EPA, defines energy efficiency regulations for a variety of electronic devices. For example, the efficiency level certifications of PC power supply are classified to a basic 80 PLUS level (80%, 80%, 80%), an 80 PLUS bronze level (82%, 85%, 82%), an 80 PLUS silver level (85%, 88%, 85%), and an 80 PLUS gold level (87%, 90%, 87%). As such, the topic of enhancing power converting efficiency has been a major task that the suppliers of the power supply units is facing. Moreover, it is widely perceived that the power converting efficiency for the current pulse width modulation (PWM) controller, such as a forward PWM controller or other configurations, is not able to meet the energy efficiency regulations. In general, a front end DC/DC power convertor includes a PWM power convertor and a resonant power convertor. Since switch of the PWM power convertor belongs to hard-switch convertor topologies, the switching loss would be easily generated and would not improve the power converting efficiency. Therefore, resonant power convertors were developed to overcome the aforementioned undesirable problem of switching loss, since the resonant power convertor is associated with a soft-switching mechanism.

Conventional resonant power convertors could be primarily divided into three categories: (1) a series resonant convertor (referred to as "SRC"), (2) a parallel resonant convertor (referred to as "PRC"), and (3) a series-parallel resonant convertor (referred to as "LLC"). A controller of the resonant power convertor outputs a switching signal to a power switch of the resonant power convertor for controlling an output voltage of the resonant power convertor. However, since the conventional controller of the resonant power convertor has limits of switching frequency, the convertor gain would be limited and easily have issue of insufficient output voltage

SUMMARY OF THE INVENTION

The present invention provides a resonant power converting circuit which could adjust the lowest switching frequency of the controller base on the output current. Thus, the voltage gain of the resonant power converting circuit would increase during peak load period.

The present invention provides a resonant power converting circuit including a resonant converting unit, a control unit, a current detecting unit and a frequency modulation unit. The control unit is coupled to the resonant power converting circuit, for outputting at least one first switching signal to the resonant converting unit so as to adjust an output voltage of the resonant converting unit. The current detecting unit is coupled to an output of the resonant converting unit for detecting an output current of the resonant converting unit. The frequency modulation unit is coupled to the current detecting circuit and the control unit for adjusting the lowest switching frequency of the control unit in response to the output current. When the output current value exceeds a predetermined current value the lowest switching frequency of the control unit is increased by the frequency modulation unit.

In one aspect of the present invention, the frequency modulation unit comprises a first resistor and a first modulation unit. The first resistor is coupled between a frequency setup terminal of the control unit and a ground terminal The first modulation unit is coupled to the current detecting unit and the frequency setup terminal of the control unit.

In another aspect of the present invention, the first modulation unit includes a PNP transistor, a second resistor, a third resistor, a fourth resistor, a fifth resistor, a sixth resistor, a first NMOS transistor, and a second NMOS transistor. An emitter of the PNP transistor is coupled to a voltage source, and a second resister is coupled between the emitter and the base of the PNP transistor. A terminal of the third resistor is coupled to the base of the PNP transistor. The drain of the first NMOS transistor is coupled to the other terminal of the third resister. The source of the first NMOS is coupled to the ground. The gate of the first NMOS transistor is coupled to the current detecting unit. The first capacitor is coupled between the gate of the first NMOS transistor and the ground terminal, and the fourth resistor is coupled between the gate of the first NMOS transistor and the ground terminal. A terminal of the fifth resister is coupled to the frequency setting terminal of the control unit. The drain of the second NMOS transistor is coupled to the other terminal of the fifth resistor. The source of the second NMOS transistor is coupled to the ground terminal. The gate of the second NMOS transistor is coupled to the collector of the first PNP transistor. The second capacitor is coupled between the gate of the second NMOS transistor and the ground terminal, and the sixth resistor is coupled between the gate of the second NMOS transistor and the ground terminal.

Yet, in another aspect of the present invention, the aforementioned frequency modulation unit includes a first resistor, a grounded capacitor, and a first modulation unit. A first terminal of the first resistor is coupled to the frequency setup terminal of the control unit, and the grounded capacitor is coupled between a second terminal of the first resistor and the ground terminal. The first modulation unit is coupled to the current detecting unit and the frequency setup terminal of the control unit.

Yet, in another aspect of the present invention, the aforementioned first modulation unit comprises a PNP transistor, a second resistor, a third resistor, a fourth resistor, a fifth resistor, a sixth resistor, a seventh resistor, an eighth resistor, a ninth resistor, a tenth resistor, a first NMOS transistor, a second NMOS transistor, a third NMOS transistor and a NPN transistor. The emitter of the PNP transistor is coupled to a voltage source. The second resistor is coupled between the emitter and the base of the first PNP transistor. A terminal of the third resistor is coupled to the base of the PNP transistor. The drain of the first NMOS transistor is coupled to the other terminal of the third resister. The source of the first NMOS transistor is coupled to the ground terminal. The gate of the first NMOS transistor is coupled to the current detecting unit. The first capacitor is coupled between the gate of the first NMOS transistor and the ground terminal. The fourth resister is coupled between the gate of the first NMOS transistor and the ground terminal. A terminal of the fifth resister is coupled the frequency setting pin of the control unit. The drain of the second NMOS transistor is coupled to the other terminal. The source of the second NMOS transistor is coupled to the second terminal of the first resister. The gate of the second NMOS transistor is coupled to the collector of the PNP transistor. A first terminal of the sixth resister is coupled to the collector of the PNP transistor. The seventh resister is coupled between a second terminal of the sixth resister and ground terminal. The base of the NPN transistor is coupled to the second terminal of the sixth resister. The emitter of the NPN transistor is coupled to ground terminal. The eighth resister is coupled between the emitter of the PNP transistor and the collector of the NPN transistor. The ninth resister is coupled between the collector of the NPN transistor and ground terminal. The second capacitor is coupled between the collector of the NPN transistor and ground terminal A terminal of the tenth resister is coupled to the collector of the PNP transistor. The drain of the third NMOS transistor is coupled to the other terminal of the tenth resister. The source of the third NMOS transistor is coupled to ground terminal The gate of the third NMOS is coupled to the collector of the NPN transistor.

Yet, in another aspect of the present invention, the aforementioned current detecting unit includes a resister and a detecting circuit. The aforementioned resister is connected in series with the output of the aforementioned resonant converting unit. The aforementioned detecting circuit is coupled to the two terminals of the aforementioned resister for detecting the aforementioned output current of the aforementioned resonant converting unit.

Yet, in another aspect of the present invention, the resonant converting circuit is a LLC resonant convertor.

Yet, in another aspect of the present invention, the control unit further outputs a second switching signal to the resonant converting unit. The duty cycle of the first switching signal is substantially 50%, while the duty cycle of the second switching signal is substantially 50%, wherein the waveforms of the first switching signal and the second switching signal are in anti-phase (180-degree out of phase).

In summary, the resonant power converting circuit of the present invention may adjust the lowest switching frequency of the controller based on the output current of the convertor, so that the operating frequency range of the switching signals may be modulated appropriately in response to a variation of gain curve of the convertor. Consequently, the resonant converting unit of the resonant power converting circuit may obtain the necessary gain to increase the output voltage.

In order to have further understanding regarding to the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

(First Embodiment)

A voltage gain curve of the resonant power convertor varies according to a variation in a load or an output voltage. For example, when the load increases, an operating frequency associated with a maximum voltage gain increases accordingly. Since a switching signal frequency output from a conventional controller is restricted by its internal oscillation frequency, wherein the internal oscillation frequency is usually constant and the output frequency modulation range thereof does not vary with an output of the resonant power convertor. Therefore, in certain situations, the resonant power convertor can not obtain a maximum gain due to the limitation of an operating frequency region of the switching signal. For instance, while the resonant power convertor is operated under a heavy load or a peak load, the frequency of the maximum gain increases. Thus, the resonant power converting circuit according to the present embodiment is configured to adjust a lowest switching frequency of the controller in response to the variation of a gain curve thereof, so that the resonant power may obtain a higher gain to increase an output voltage thereof. Additionally, when a feedback is out of control indicative of a system anomaly the output voltage boosts up. The output voltage may need to exceed an over-voltage protection point to trigger a over voltage protection before the power supply could be shut down. To achieve the above-mentioned goal, the lowest switching frequency of the controller may be downwardly adjusted upon the detection of the climb of the output voltage for increasing the gain of the resonant power convertor, so that the resonant power convertor may obtain enough gain to increase the output voltage to trigger a protection circuit.

In the present embodiment, the controller may obtain a current load condition or a feedback state according to the output voltage and the output current of the resonant power convertor and then may adjust the lowest switching frequency accordingly, so that the controller may adjust the frequency of the switching signal within a larger switching frequency range to ensure that the resonant power convertor could operate at the maximum gain point to conform to system requirements. Since the lowest switching frequency of the controller may be adjusted according to the output voltage and the output current of the resonant power convertor, the resonant power converting circuit could operate at appropriate frequencies to achieve the desirable voltage gain regardless of the condition, such as peak load or feedback being out of control, in which the resonant power converting circuit is in.

Figure 1:
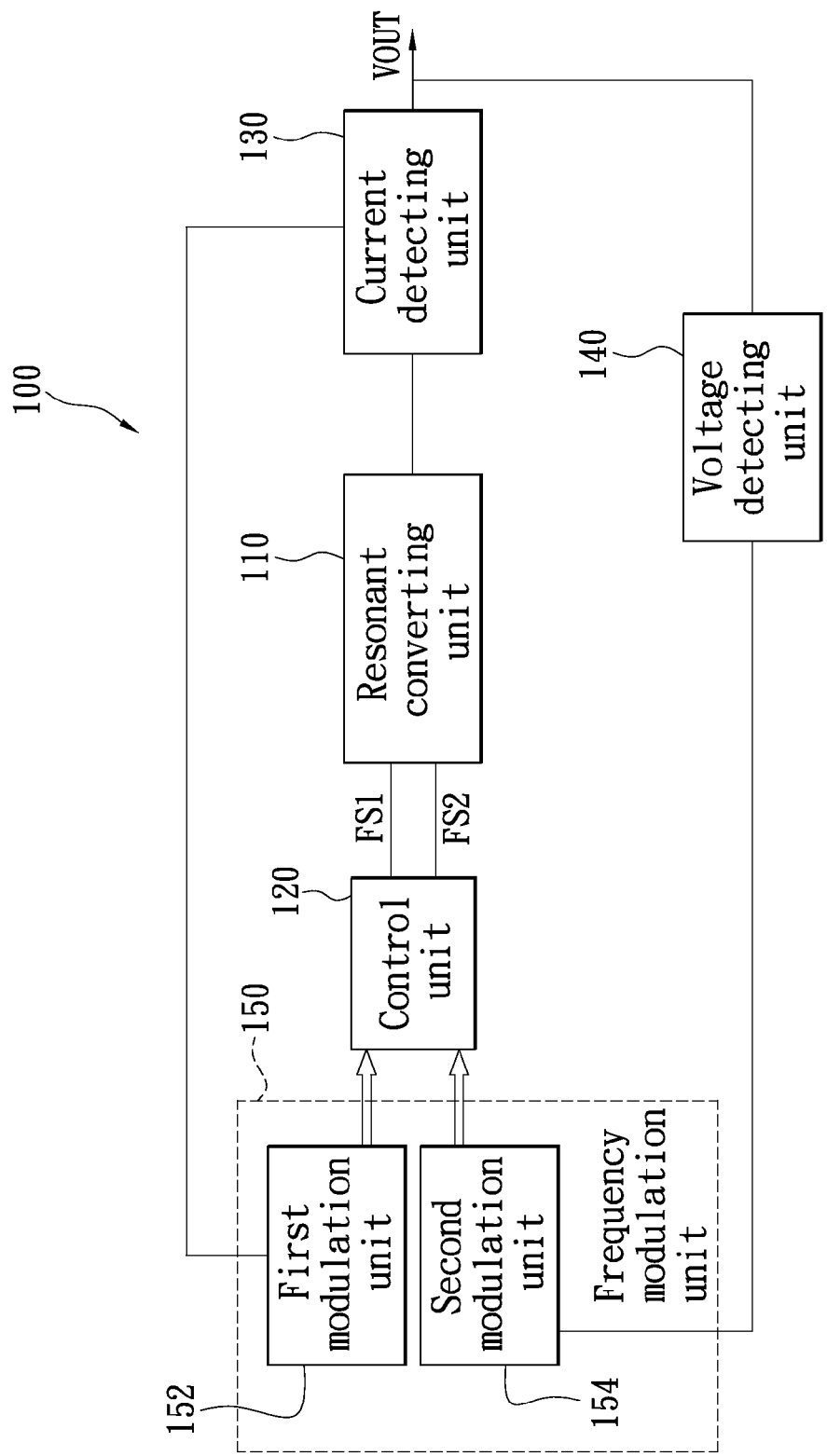
FIG. 1 illustrates a block diagram of an embodiment in accordance with a resonant power converting circuit according to the present invention.

Please refer to FIG. 1, in which a block diagram of one embodiment of the resonant power converting circuit according to the present invention is demonstrated. A resonant power converting circuit 100 comprises a resonant converting unit 110, a control unit 120, a current detecting unit 130, a voltage detecting unit 140, and a frequency modulation unit 150. The control unit 120 is coupled to the resonant converting unit 110. The frequency modulation unit 150 is coupled to the control unit 120, the current detecting unit 130, and the voltage detecting unit 140. The current detecting unit 130 and the voltage detecting voltage 140 couple to an output of the resonant converting unit 110 so as to detect the output voltage and the output current of the resonant converting unit 110.

The resonant converting unit 110 may be a series resonant convertor (SRC), a parallel resonant convertor (PRC), or a series-parallel resonant convertor (SPRC or LCC) and has no limitation in present embodiment. In the current embodiment, a half bridge LCC convertor is used for illustration. The resonant converting unit 110 has two power switches (not shown) connected in series serving as a square wave generator. The power switch of the resonant converting unit 110 is configured to be switched on and off according to the switching signal output from the control signal 120 to generate a square wave signal and then the output voltage VOUT may be generated by the resonant circuit and a voltage transformer. In the operating processes, the voltage gain of the resonant converting unit 110 corresponds to the frequency of the switching signal. As to the half bridge resonant convertor, the control unit 120 outputs two switching signals. In one implementation, each of the switching signals has a duty cycle substantially equal to 50% and is in anti-phase with respect to the other. The output switching signal from the control unit 120 as shown in FIG. 1 includes a first switching signal FS1 and a second switching signal FS2, for respectively controlling switches (e.g., a power transistor) inside the resonant converting unit 110. The control unit 120 may adjust the gain of the resonant converting unit 110 based on the frequencies of the first switching signal FS1 and the second switching signal FS2, thereby further modulating the output voltage VOUT of the resonant converting unit 110.

In addition, the circuitry configuration of the resonant converting unit 110 may be a full bridge circuit, so that the control unit 120 may output four switching signals to control the power switches inside the resonant converting unit 110. The control unit 120 may output at least one switching signal to the resonant converting unit 110 based on the circuitry configuration and modulate the gain of the resonant converting unit 110 with respect to the frequency of the switching signal before the desirable output voltage could be generated.

The control unit 120 may serve as a signal generator, which may be implemented by a high voltage resonant control integrated chip, such as L6599 provided by STMicroelectronics. Generally speaking, the frequency of the switching signal output from the control unit is restricted by the internal oscillation frequency of the integrated chip, and the switching signal has a limitation of a lowest switching frequency value. Using the aforementioned chip L6599 as an example, the lowest switching frequency of the switching signal is set by a frequency setup terminal. In other words, by setting up the frequency setup terminal the lowest operating frequencies of the first switching signal FS1 and the second switching signal FS2 may be determined. Since the gain of the resonant converting unit 110 varies in response to the switching frequencies of the first switching signal FS1 and the second switching signal FS2, by adjusting the lowest switching frequency of the control unit 120 a larger range for the gain modulation of the resonant converting unit 110 may be obtained. It is noted that the adjustment of the lowest switching frequency refers to adjusting a frequency lower limit of the switching signal output from the control unit 120, rather than adjusting the frequency of the switching signal directly.

The current detecting unit 130 and the voltage detecting unit 140 are used to detect the output current and output voltage of the resonant converting unit 110, respectively. The frequency modulation unit 150 may adjust the lowest switching frequency of the control unit 120 according to the output current and output voltage of resonant converting unit 110. Continuing with the example of L6599 as the control unit 120, the frequency modulation unit 150 may modulate the lowest switching frequency of the control unit 120 by adjusting a resistance value of a resistor coupled to the frequency setup terminal Fmin. It is also noted that different control integrated chips may be associated with different frequency setting methods. The L6599 is only one embodiment of the present invention and the invention is not limited thereto. It is also understood by those skilled in the art from this disclosure that the control unit 120 may be implemented by other devices, and therefore the description is omitted.

The frequency modulation unit 150 includes a first modulation unit 152 and a second modulation unit 154 coupled to the current detecting unit 130 and the voltage detecting unit 140, respectively. The first modulation unit 152 may adjust the lowest switching frequency of the control unit 120 according to the output current of the resonant converting unit 110. The second modulation unit 154, meanwhile, may adjust the lowest switching frequency of the control unit 120 according to the output voltage of the resonant converting unit 110. For example, while the output current detected from the resonant converting unit 110 is larger than a predetermined current value, indicative of the frequency modulation unit 150 is operated under a heavy load, the frequency modulation unit 150 may increase the lowest switching frequency of the control unit 120; while the output voltage detected from the resonant converting unit 110 is larger than a predetermined voltage value, which may cause the feedback to be out of control, the frequency modulation unit 150 may decrease the lowest switching frequency of the control unit 120. Therefore, the control unit 120 may adjust the lowest switching frequency of the switching signal when the resonant converting unit 110 is operated under the heavy load or is associated with the out-of-control feedback, so that the resonant converting unit 110 may obtain a higher gain to generate desirable output voltage.

Figure 2A:
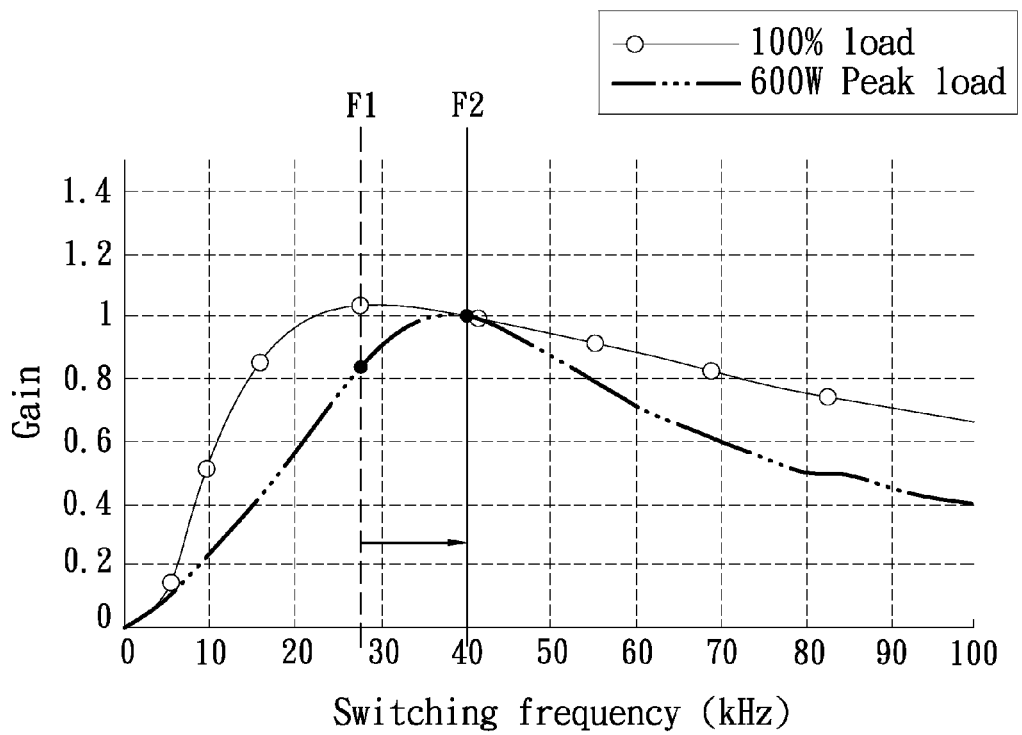
FIG. 2A illustrates a load-gain curve diagram of the embodiment in accordance with certain aspects of the present invention.

Please refer to FIG. 2A, in which a load-gain curve diagram of one embodiment in accordance with certain aspects of the present invention is demonstrated. In FIG. 2A, a 280-Watt power supplier is utilized and the two curves shown in FIG. 2A represents the gain curves associated with a 280-Watt load and a 600-Watt peak load, respectively. As to the gain curve associated with the 280-Watt load, the frequency for the maximum gain is F1. Regarding the gain curve associated with the 600-Watt peak load, the frequency for the maximum gain is F2. As such, it could be inferred from FIG. 2A that whether in the conditions of heavy load or peak load the corresponding frequency associated with the maximum gain may increase. In other words, as the output current detected from the resonant converting unit 110 is larger than the predetermined current value, the first modulation unit 152 is configured to upwardly adjust the lowest switching frequency of the control unit 120 for the switching signal, and in doing so the first modulation unit 152 may cause the increase in the gain of the resonant converting unit 110, ensuing a stable output of the resonant converting unit 110. For example, the first modulation unit 152 may upwardly adjust the lowest switching frequency of the control unit 120 up to the frequency F2 as shown in FIG. 2A. Also shown in FIG. 2A, an initial lowest switching frequency is at the frequency of F1 and when operating under the 600-Watt peak load the first modulation unit 152 may upwardly adjust the lowest frequency of the control unit 120 from the frequency of F1 (27K Hz), which correspond to the gain of 0.83, to the frequency of F2 (40K Hz), which correspond to the gain of 0.99.

The feedback being out of control represents that the power supplier malfunctions, e.g., components are out of function or being damaged. Meanwhile, it is necessary to cause the output voltage of the resonant converting unit 110 to be exceeding the overvoltage protection point where the overvoltage protecting mechanism could be triggered to shut down the power supplier. Therefore, as the voltage detecting unit 140 detects the output voltage exceeds the predetermined voltage value, the second modulation unit 154 decreases the lowest switching frequency of the control unit 120, so that the resonant converting unit 110 may obtain a higher gain for increasing the output voltage to trigger the overvoltage protecting mechanism. Please refer to FIG. 2B, in which a gain curve diagram of the present invention is illustrated. While an initial lowest switching frequency is at the frequency of F1 (27 k Hz), which correspond to the voltage gain of 1.07. While the second modulation unit 154 downwardly adjusts the lowest switching frequency of the control unit 120 to the frequency of F3 (30 k Hz), which correspond to the voltage gain of 1.11, causing the output voltage of the resonant converting unit 110 to reach to the overvoltage protection point.

The resonant power converting circuit 100 may modulate the gain of the resonant converting unit 110 when operating under the peak load or in the overvoltage situation, so that the resonant converting unit 110 may operate in a higher gain point to generate a required output voltage. It is noted that the aforementioned predetermined current value and predetermined voltage value, both of which are used for determining the presence of the peak load or the occurrence of whether feedback has been out of control may be determined based on design requirements.

(Second Embodiment)

Figure 3:
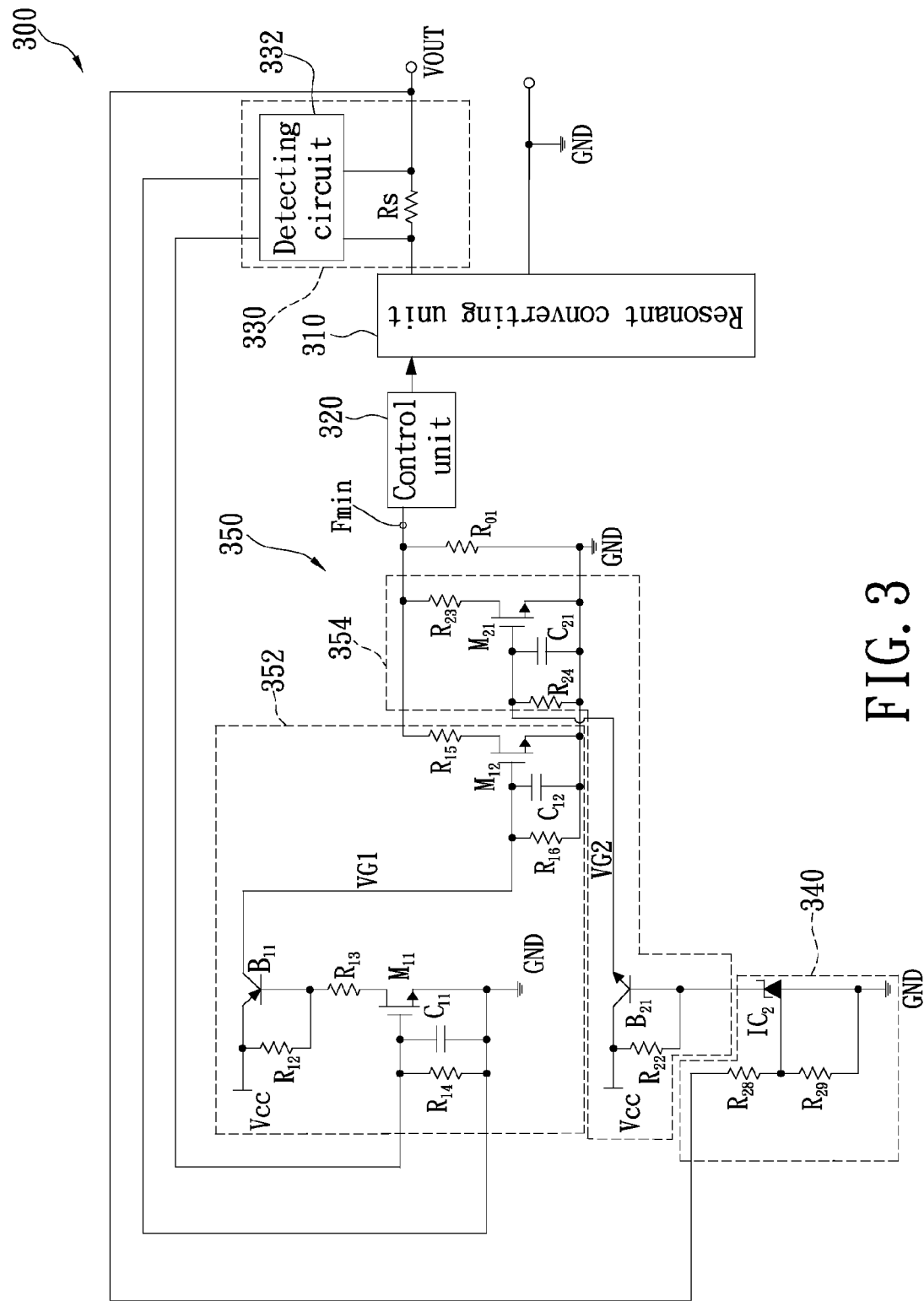
FIG. 3 illustrates a circuit diagram of the embodiment in accordance with the resonant power converting circuit according to the present invention.

Please refer to FIG. 3, in which a circuit diagram of another embodiment in accordance with the resonant power converting circuit according to the present invention is shown. A resonant power converting circuit 300 comprises a resonant converting unit 310, a control unit 320, a current detecting unit 330, a voltage detecting unit 340, and a frequency modulation unit 350. The frequency modulation unit 350 further includes a first modulation unit 352 and a second modulation unit 354. The current detecting unit 330 includes a resistor $R_s$ and a detecting circuit 332. The resistor $R_s$ connects in series to an output of the resonant converting unit 310 for converting a current signal to a voltage signal. The detecting circuit 332 is coupled to two terminals of the resistor $R_s$ may detect the output current of the resonant converting unit 310 based on voltage drops thereof. The detecting circuit 332 may be implemented by a current detecting component or a voltage detecting circuit. The voltage detecting unit 340 includes resistors $R_{28}$ and $R_{29}$ and a three-terminal component $IC_2$, wherein the resistors $R_{28}$ and $R_{29}$ connects in series between the output of the resonant converting unit 310 and a ground terminal(GND). The three-terminal component $IC_2$ is coupled between the second modulation unit 354 and the ground terminal (GND). A reference terminal of the three-terminal component $IC_2$ is coupled to a common node of the resistors $R_{28}$ and $R_{29}$.

The three-terminal component $IC_2$ could be a voltage regulator TL431 manufactured by Texas Instruments having a reference terminal (REF) thereof coupled to the resistors $R_{28}$ and $R_{29}$, an anode (ANODE) coupled to the ground terminal (GND), and a cathode (CATHODE) coupled to a base of a NPN transistor $B_{21}$. The three-terminal component $IC_2$ may adjust the output voltage from the cathode based on the voltage of the reference terminal (REF).

The control unit 320 has a frequency setup terminal $F_{min}$ and a resistor $R_{01}$. The resistor $R_{01}$ is coupled between the frequency setup terminal $F_{min}$ and the ground terminal (GND). The oscillation frequency of the control unit 320 is determined by a resistance value coupled to the frequency setup terminal $F_{min}$. In the embodiment, the frequency modulation unit 350 includes the resistor $R_{01}$, the first modulation unit 352, and the second modulation unit 354. The resistor $R_{01}$ is coupled between the frequency setup terminal $F_{min}$ and the ground terminal (GND). The first modulation unit 352 and the second modulation unit 354 couple to the frequency setup terminal $F_{min}$, and may be selectively configured to have one of their resistors connected to a resistor in parallel, so that the resistance value connected to the frequency setup terminal $F_{min}$ may be adjusted, thereby modulating the lowest switching frequency of the control unit 320. In one implementation, the resistor of the first modulation unit 352 ($R_{15}$) and the resistor of the second modulation unit 354 ($R_{23}$) are selectively connected to the resistor $R_{01}$, for adjusting the resistance value connected to the frequency setup terminal.

The first modulation unit 352 includes resistors $R_{12}$~$R_{16}$, capacitors $C_{11}$~$C_{12}$, a PNP transistor $B_{11}$, and NMOS transistors $M_{11}$ and $M_{12}$, wherein the PNP transistor is referred to PNP bipolar junction transistor and the NMOS transistor is referred to N channel metal-oxide-semiconductor field-effect transistor. An emitter of the PNP transistor $B_{11}$ is coupled to the voltage source $V_{cc}$. The resistor $R_{12}$ is coupled between the emitter and a base of the PNP transistor $B_{11}$. A first terminal of the resistor $R_{13}$ is coupled to the base of the PNP transistor $B_{11}$. A drain of the NMOS transistor $M_{11}$ is coupled to a second terminal of the resistor $R_{13}$. A source of the NMOS transistor $M_{11}$ is coupled to the ground terminal (GND). A gate of the NMOS transistor $M_{11}$ is coupled to the detecting circuit 332 of the current detecting unit 330.

The capacitor $C_{11}$ is coupled between the gate of the NMOS transistor $M_{11}$ and the ground terminal (GND). The resistor $R_{14}$ is coupled between the gate of the NMOS transistor $M_{11}$ and the ground terminal (GND). A terminal of the resistor $R_{15}$ is coupled to the frequency setup terminal $F_{min}$ of the control unit 320. A drain of the NMOS transistor $M_{12}$ is coupled to another terminal of the resistor $R_{15}$, wherein a source thereof is coupled to a ground terminal, and a gate thereof is coupled to a collector of the PNP transistor $B_{11}$. The capacitor $C_{12}$ is coupled between the gate of the NMOS transistor $M_{12}$ and the ground terminal GND. The resistor $R_{16}$ is coupled between the gate of the NMOS transistor $M_{12}$ and the ground terminal (GND).

Normally, the NMOS transistor $M_{12}$ is in a cut off state. When the detecting circuit 332 detects the output current of the resonant converting unit 310 has been exceeding the predetermined current value, the detecting circuit 332 conducts the NMOS transistor $M_{11}$. Meanwhile, the first modulation unit 352 generates a first control signal VG1 of a "high" voltage level to conduct the NMOS transistor $M_{12}$, so that the resistor $R_{15}$ and the resistor $R_{01}$ are connected in parallel, thereby decreasing the resistance value connected to the frequency setup terminal $F_{min}$. Consequently, the lowest switching frequency of the control unit 320 may be increased, as shown in FIG. 2A.

The second modulation unit 354 includes resistors $R_{22}$~$R_{24}$, a capacitor $C_{21}$, a NPN transistor $B_{21}$, and a NMOS transistor $M_{21}$, wherein the NPN transistor is referred to NPN bipolar junction transistor. A collector of the NPN transistor $B_{21}$ is coupled to the voltage source $V_{cc}$. A base of the NPN transistor $B_{21}$ is coupled to the three-terminal component $IC_2$ of the voltage detecting unit 340. The resistor $R_{22}$ is coupled between the collector and a base of the NPN transistor $B_{21}$. A terminal of the resistor $R_{23}$ is coupled to the frequency setup terminal $F_{min}$ of the control unit 320. The NMOS transistor $M_{21}$ has a drain coupled to a second terminal of the resistor $R_{23}$, a source coupled to the ground terminal (GND) and a gate coupled to an emitter of the NPN transistor $B_{21}$. The capacitor $C_{21}$ is coupled between the gate of the NMOS transistor $M_{21}$ and the ground terminal (GND). The resistor $R_{24}$ is coupled between the gate of the NMOS transistor $M_{21}$ and the ground terminal (GND).

Figure 2B:
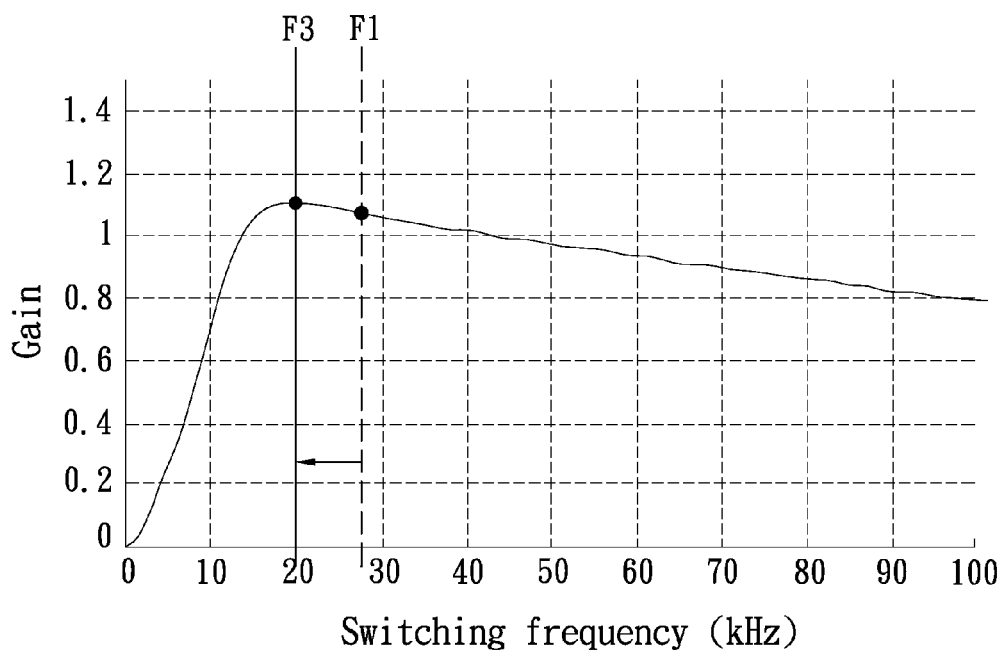
FIG. 2B illustrates a gain curve diagram of another embodiment in accordance with the resonant power converting circuit according to the present invention.

Normally, the NMOS transistor $M_{21}$ is in a conduction state and the resistor $R_{23}$ could be considered as being connected in parallel with the resistor $R_{01}$. When the voltage detecting unit 340 detects the output voltage of the resonant converting unit 310 has been exceeding the predetermined voltage value, the voltage detecting unit 340 may cut off the NPN transistor $B_{21}$, so that the second modulation unit 354 may generate a second control signal VG2 of a "low" voltage level. Meanwhile, the second modulation unit 354 cuts off the NMOS transistor $M_{21}$, so that the resistor $R_{23}$ and the resistor $R_{01}$ are not connected in parallel. Consequently, the resistance value connected to the frequency setup terminal $F_{min}$ of the control unit 320 may increase, thereby decreasing the lowest switching frequency of the control unit 320. As shown in FIG. 2B, a lower lowest switching frequency may lead to a higher gain for the resonant converting unit 310.

(Third Embodiment)

Figure 4:
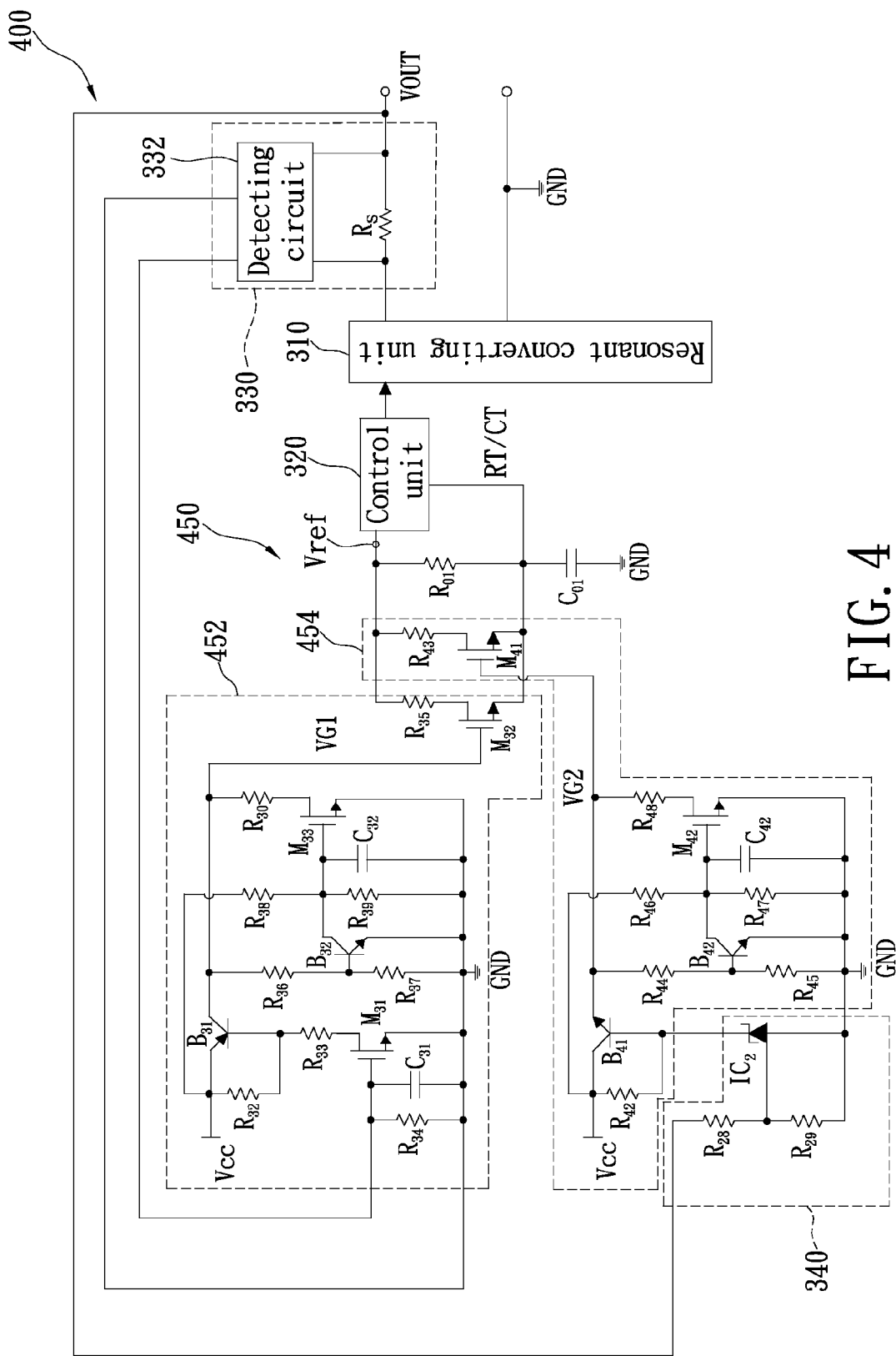
FIG. 4 illustrates a circuit diagram of an embodiment in accordance with a converting unit according to the present invention.

The aforementioned FIG. 3 demonstrates an embodiment of the present invention, wherein the frequency modulation unit may be replaced with other resonant controllers with different specifications such as CM6901 chip manufactured by Champion-micro. Please refer to FIG. 4, in which a circuit diagram of an embodiment in accordance with a converting unit according to the present invention is demonstrated. The primary difference between FIG. 3 and FIG. 4 is the frequency modulation unit 450. In FIG. 4, the frequency modulation unit 450 includes the resistor $R_{01}$, a grounded capacitor $C_{01}$, a first modulation unit 452, and a second modulation unit 454. The resistor $R_{01}$ and the grounded capacitor $C_{01}$ are connected in series between the frequency setup terminal Vref of the control unit 320 and the ground terminal (GND). A junction of the resistor $R_{01}$ and the grounded capacitor $C_{01}$ is coupled to RT/CT pin of the control unit 320. More specifically, the frequency setup terminal of CM6901 is the pin number 16 (Vref). Therefore, the resistor $R_{01}$ is coupled between the pin number 16 (Vref) and the pin number 9 (RT/CT) of the CM6901. The grounded capacitor $C_{01}$ is coupled between the pin number 9 (RT/CT) and the ground terminal (GND). The circuit design with respect to CM6901 chip may refer the CM6901 data sheet, and therefore the description is omitted.

The first modulation unit 452 includes resistors $R_{30}$~$R_{39}$, capacitors $C_{31}$~$C_{32}$, a PNP transistor $B_{31}$, a NPN transistor $B_{32}$, and NMOS transistors $M_{31}$, $M_{32}$, and $M_{33}$. An emitter of the PNP transistor $B_{31}$ is coupled to the voltage source $V_{cc}$. The resistor $R_{32}$ is coupled between the emitter and a base of the PNP transistor $B_{31}$. The resistor $R_{33}$ is coupled between the base of the PNP transistor $B_{31}$ and a drain of the NMOS transistor $M_{31}$. A source of the NMOS transistor $M_{31}$ is coupled to the ground terminal (GND). A gate of the NMOS transistor $M_{31}$ is coupled to the current detecting unit 330. The capacitor $C_{31}$ is coupled between the gate of the NMOS transistor $M_{31}$ and the ground terminal (GND). The resistor $R_{34}$ is coupled between the gate of the NMOS transistor $M_{31}$ and the ground terminal (GND). The resistor $R_{35}$ is coupled between the frequency setup terminal Vref of the control unit 320 and a drain of the NMOS transistor $M_{32}$. A source of the NMOS transistor $M_{32}$ is coupled to the junction of the resistor $R_{01}$ and the grounded capacitor $C_{01}$, and a gate of the NMOS transistor $M_{32}$ is coupled to a collector of the PNP transistor $B_{31}$.

The resistor $R_{36}$ is coupled between the collector of the PNP transistor $B_{31}$ and the resistor $R_{37}$, wherein another terminal of the resistor $R_{37}$ is coupled to the ground terminal (GND). A base of the NPN transistor $B_{32}$ is coupled to the junction of the resistor $R_{36}$ and the resistor $R_{37}$. An emitter of the NPN transistor $B_{32}$ is coupled to the ground terminal (GND). The resistor $R_{38}$ is connected in series with the resistor $R_{39}$, both of which are coupled between the collector of the PNP transistor $B_{31}$ and the ground terminal (GND), wherein the junction of the resistors $R_{38}$ and $R_{39}$ is coupled to a collector of the NPN transistor $B_{32}$. The capacitor $C_{32}$ is coupled between the collector of the NPN transistor $B_{32}$ and the ground terminal (GND). The resistor $R_{30}$ has one terminal coupled to the collector of the PNP transistor $B_{31}$ and another terminal coupled to a drain of the NMOS transistor $M_{33}$ which has a source coupled to the ground terminal (GND) and a gate coupled to the collector of the NPN transistor $B_{32}$.

Normally, as shown in FIG. 3, the NMOS transistor $M_{32}$ is in a cut off state. When the detecting circuit 332 detects the output current of the resonant converting unit 310 has been exceeding the predetermined current value, the detecting circuit 332 conducts the NMOS transistor $M_{31}$. Meanwhile, the first modulation unit 452 generates a first control signal VG1 of a "high" voltage level to conduct the NMOS transistor $M_{32}$, so that the resistor $R_{35}$ and the resistor $R_{01}$ are connected in parallel. Since the resistor $R_{35}$ and the resistor $R_{01}$ are connected in parallel, the resistance value connected to the frequency setup terminal Vref decreases. Consequently, the lowest switching frequency of the control unit 320 may be increased, so that the resonant converting unit 310 may obtain a higher gain, as shown in FIG. 2A.

The second modulation unit 454 includes resistors $R_{42}$~$R_{48}$, a capacitor $C_{42}$, NPN transistors $B_{41}$ and $B_{42}$, and NMOS transistors $M_{41}$ and $M_{42}$. The NPN transistor $B_{41}$ has a collector coupled to the voltage source $V_{cc}$ and a base coupled to the voltage detecting unit 340. The resistor $R_{42}$ is coupled between the collector and the base of the NPN transistor $B_{41}$. The resistor $R_{43}$ is coupled between the frequency setup terminal $V_{ref}$ of the control unit 320 and a drain of the NMOS transistor $M_{41}$. A source of the NMOS transistor $M_{41}$ is coupled to the ground terminal (GND). A gate of the NMOS transistor $M_{41}$ is coupled to an emitter of the NPN transistor $B_{41}$. The resistor $R_{44}$ connected in series with the resistor $R_{45}$, both of which are coupled between the emitter of the NPN transistor $B_{41}$ and the ground terminal (GND). And the junction of the resistors $R_{44}$ and $R_{45}$ is coupled to a base of the NPN transistor $B_{42}$, and an emitter of the NPN transistor $B_{42}$ is coupled to the ground terminal (GND). The resistor $R_{46}$ is coupled between the collector of the NPN transistor $B_{41}$ and a collector of the NPN transistor $B_{42}$. The resistor $R_{47}$ is coupled between the collector of the NPN transistor $B_{42}$ and the ground terminal (GND). The capacitor $C_{42}$ is coupled between the collector of the NPN transistor $B_{42}$ and the ground terminal (GND). The resistor $R_{48}$ has one terminal coupled to the emitter of the NPN transistor $B_{41}$ and another terminal coupled to a drain of the NMOS transistor $M_{42}$, wherein the NMOS transistor $M_{42}$ has a source coupled to the ground terminal (GND), and a gate coupled to the collector of the NPN transistor $B_{42}$.

Normally, the NMOS transistor $M_{41}$ is in a conduction state and the resistor $R_{43}$ is considered as being connected in parallel with the resistor $R_{01}$. When the voltage detecting unit 340 detects the output voltage of the resonant converting unit 310 has been exceeding the voltage default value, the voltage detecting unit 340 cut off the NPN transistor $B_{41}$, so that the second modulation unit 454 generates a second control signal VG2 of a "low" voltage level. Meanwhile, the second modulation unit 454 cuts off the NMOS transistor $M_{41}$, so that the resistor $R_{43}$ and the resistor $R_{01}$ are no longer connected in parallel. Consequently, the resistance value connected to the frequency setup terminal $V_{ref}$ of the control unit 320 increases, thereby decreasing the lowest switching frequency of the control unit 320. As shown in FIG. 2B, a lower lowest switching frequency may correspond to a higher gain for the resonant converting unit 310.

All other circuitry configuration in FIG. 4 is similar to that in FIG. 3 and the circuit principles of these two figures are also similar with each other. Therefore, the operation of the circuit in FIG. 4 can be easily understood by those skilled in the art from the disclosure of the aforementioned embodiments, and therefore the description is omitted. Additionally, even though FIG. 3 and FIG. 4 employ different chips for examples, the frequency modulation units 350 and 450 may be interchangeably applicable and adjusted in the embodiments shown in FIG. 3 and FIG. 4 base on chip specification, and the present embodiment is not limited thereto. From the disclosure of the aforementioned embodiments, it is understood by those skilled in the art that the frequency modulation units 350 and 450 may be implemented by other methods, and therefore the description is omitted. Additionally, it is noted that FIG. 3 and FIG. 4 are merely exemplary embodiments of the present invention, and the implemented circuits of the present invention is not limited thereto. Therefore, the elements in FIG. 1 may be implemented by different circuit base on functions thereof. From the disclosure of the aforementioned embodiments, it is understood by those skilled in the art that the elements in FIG. 1 may be implemented by other methods, and therefore the description is omitted.

(Fourth Embodiment)

In the aforementioned embodiment as shown in FIG. 1, the adjustment of the lowest switching frequency may be based upon adjusting the output current or the output voltage, wherein a partial circuit used to adjust the lowest switch frequency based on the output current includes the first modulation unit 152 and the current detecting unit 130, and the other partial circuit used to adjust the lowest switching frequency based on the output voltage includes the second modulation unit 154 and the voltage detecting unit 140. Since the first modulation unit 152 and the second modulation unit 154 both have a function of adjusting the lowest switching frequency of the control unit 120, the circuits for detecting the output current and the output voltage may operate independently or be integrated within the same resonant power converting circuit.

Figure 5:
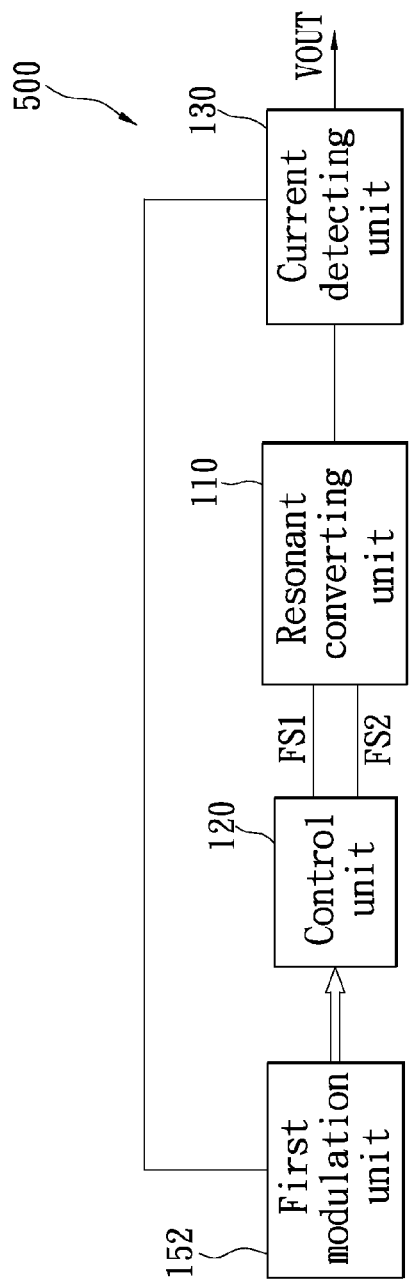
FIG. 5 illustrates a block diagram of yet another embodiment in accordance with a resonant power converting circuit being suitable for detecting current according to the present invention.

Please refer to FIG. 5, in which a block diagram of an embodiment of a resonant power converting circuit suitable for detecting current according to the present invention is demonstrated. Please refer to FIG. 6, in which a block diagram of an embodiment in accordance with a resonant power converting circuit suitable for detecting voltage according to the present invention is demonstrated. In FIG. 5, the resonant power converting circuit 500 comprises the resonant converting unit 110, the control unit 120, the current detecting unit 130, and the first modulation unit 152. The frequency modulation unit in the embodiment of FIG. 5 merely includes the first modulation unit 152. The control unit 120 is coupled to the resonant converting unit 110. The first modulation unit 152 is coupled to the control unit 120 and the current detecting unit 130. The current detecting unit 130 is coupled to the output of the resonant converting unit 110 so as to detect the output current of the resonant converting unit 110. When the output current detected from the resonant converting unit 110 is larger than the predetermined current value, the first modulation unit 152 increases the lowest switching frequency of the control unit 120, so that the resonant converting unit 110 may obtain a higher gain. The operations of components in FIG. 5 may be the same as those of the components in FIG. 1, and the circuitry implementation methods may be the same as those in FIG. 3 and FIG. 4, and therefore the description is omitted.

Figure 6:
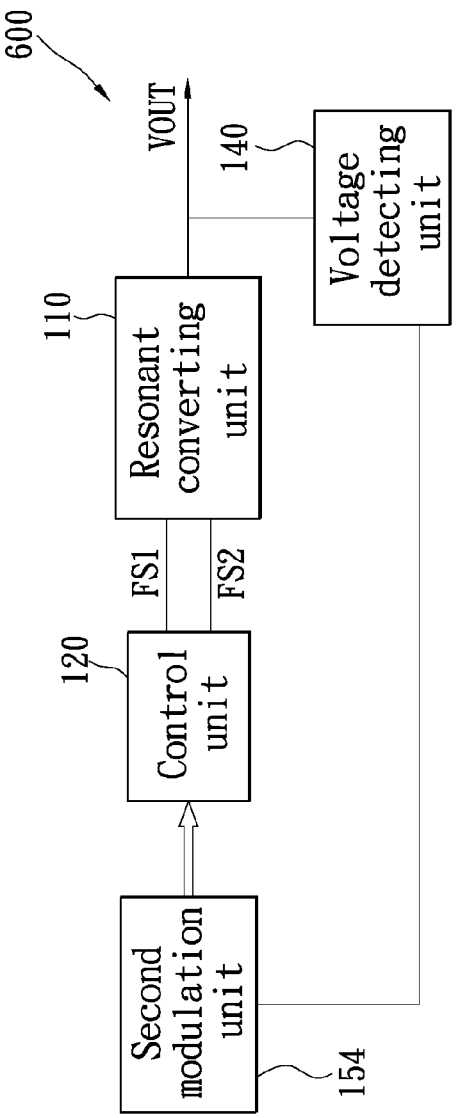
FIG. 6 illustrates a block diagram of further another embodiment in accordance with a resonant power converting circuit being suitable for detecting voltage according to the present invention.

In FIG. 6, the resonant power converting circuit 600 comprises the resonant converting unit 110, the control unit 120, the voltage detecting unit 140, and the second modulation unit 154. The frequency modulation unit in the embodiment of FIG. 6 merely includes the second modulation unit 154. The second modulation unit 154 is coupled to the control unit 120 and the voltage detecting unit 140. When the output voltage detected from the resonant converting unit 110 is larger than the predetermined voltage value, the second modulation unit 154 decreases the lowest switching frequency of the control unit 120, so that the resonant converting unit 110 may obtain a higher gain as well. The operations of components in FIG. 6 may be the same as those of the components in FIG. 1, and the circuitry implementation methods may be the same as those discussed in the description for both FIG. 3 and FIG. 4, therefore the description is omitted.

It is noted that the control unit 120 may be implemented by different circuits or integrated chips. Different chips and circuits may be associated with different frequency modulation method, and therefore the method disclosed in the present invention is not limited by the methods disclosed in FIG. 1~FIG. 6. According to the aforementioned descriptions, it is understood by those skilled in the art that the circuit in the present invention can be implemented by other implementation methods, and therefore the description is omitted.

As previously presented, the resonant power converting circuit according to the present invention functions by modulating the lowest switching frequency of the control unit in accordance with the output current and the output voltage of the resonant converting unit. The resonant power converting circuit may adjust the lowest switching frequency of the controller in response to a gain curve variation under different load conditions, ensuring a more desirable gain may be provided with the resonant converting unit to improve the stability the stability of the power supplier and the performance of the overvoltage protection.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A resonant power converting circuit, comprising:
    a resonant converting unit;
    a control unit, coupled to the resonant converting unit, the control unit outputting at least one first switching signal to the resonant converting unit so as to adjust an output voltage of the resonant converting unit, wherein the control unit is associated with a lowest switching frequency for limiting a frequency of the first switching signal;
    a current detecting unit, coupled to an output of the resonant converting unit, the current detecting unit detecting an output current of the resonant converting unit; and
    a frequency modulation unit, coupled to the current detecting circuit and the control unit, the frequency modulation unit adjusting the lowest switching frequency of the control unit in response to the output current and comprising
    a first resistor coupled between a frequency setup terminal of the control unit and a ground terminal; and
    a first modulation unit coupled to the current detecting unit and the frequency setup terminal of the control unit;

wherein the lowest switching frequency of the control unit is increased by the frequency modulation unit when the output current exceeds a predetermined current value.

2. The resonant power converting circuit according to claim 1, wherein the first modulation unit comprises:
a PNP transistor having an emitter coupled to a voltage source;
a second resistor coupled between the emitter of the PNP transistor and a base of the PNP transistor;
a third resistor having a terminal coupled to the base of the PNP transistor;
a first NMOS transistor having a drain coupled to another terminal of the third resistor, a source coupled to the ground terminal, and a gate coupled to the current detecting unit;
a first capacitor coupled between the gate of the first NMOS transistor and the ground terminal;
a fourth resistor coupled between the gate of the first NMOS transistor and the ground terminal;
a fifth resistor having a terminal coupled to the frequency setup terminal of the control unit;
a second NMOS transistor having a drain coupled to another terminal of the fifth resistor, a source coupled to the ground terminal, and a gate coupled to a collector of the PNP transistor;
a second capacitor coupled between the gate of the second NMOS transistor and the ground terminal; and a sixth resistor coupled between the gate of the second NMOS transistor and the ground terminal.

3. A resonant power converting circuit, comprising: a resonant converting unit;
a control unit, coupled to the resonant converting unit, the control unit outputting at least one first switching signal to the resonant converting unit so as to adjust an output voltage of the resonant converting unit, wherein the control unit is associated with a lowest switching frequency for limiting a frequency of the first switching signal;
a current detecting unit, coupled to an output of the resonant converting unit, the current detecting unit detecting an output current of the resonant converting unit; and
a frequency modulation unit, coupled to the current detecting circuit and the control unit, the frequency modulation unit adjusting the lowest switching frequency of the control unit in response to the output current and comprising
a first resistor having a first terminal coupled to a frequency setup terminal of the control unit;
a grounded capacitor coupled between a second terminal of the first resistor and a ground terminal; and
a first modulation unit coupled to the current detecting unit and the frequency setup terminal of the control unit;
wherein the lowest switching frequency of the control unit is increased by the frequency modulation unit when the output current exceeds a predetermined current value.

4. The resonant power converting circuit according to claim 3, wherein the first modulation unit comprises:
a PNP transistor having an emitter coupled to a voltage source;
a second resistor coupled between the emitter and a base of the PNP transistor;
a third resistor having a terminal coupled to the base of the PNP transistor;
a first NMOS transistor having a drain coupled to another terminal of the third resistor, a source coupled to the ground terminal and a gate coupled to the current detecting unit;
a first capacitor coupled between the gate of the first NMOS transistor and the ground terminal;
a fourth resistor coupled between the gate of the first NMOS transistor and the ground terminal;
a fifth resistor having a terminal coupled to the frequency setup terminal of the control unit;
a second NMOS transistor having a drain coupled to another terminal of the fifth resistor, a source coupled to the second terminal of the first resistor, and a gate coupled to a collector of the PNP transistor;
a sixth resistor having a first terminal coupled to the collector of the PNP transistor;
a seventh resistor coupled between a second terminal of the sixth resistor and the ground terminal;
a NPN transistor having a base coupled to the second terminal of the sixth resistor and an emitter coupled to the ground terminal;
an eighth resistor coupled between the emitter of the PNP transistor and a collector of the NPN transistor;
a ninth resistor coupled between the collector of the NPN transistor and the ground terminal;
a second capacitor coupled between the collector of the NPN transistor and the ground terminal;
a tenth resistor having a terminal coupled to the collector of the PNP transistor; and
a third NMOS transistor having a drain coupled to another terminal of the tenth resistor, a source coupled to the ground terminal, and a gate coupled the collector of the NPN transistor.

5. The resonant power converting circuit according to claim 1, wherein the current detecting unit comprises:
a resistor connected in series with the output of the resonant power converting circuit; and
a detecting circuit, coupled to two terminals of the resistor, for detecting the output current of the resonant converting circuit.

6. The resonant power converting circuit according to claim 1, wherein the resonant converting circuit is a series-parallel resonant convertor.

7. The resonant power converting circuit according to claim 1, wherein the control unit further outputs a second switching signal to the resonant converting unit, wherein a duty cycle of the first switching signal is substantially 50%, a duty cycle of the second switching signal is substantially 50%, wherein the waveforms of the first switching signal and the second switching signal are in anti-phase.

8. The resonant power converting circuit according to claim 3, wherein the current detecting unit comprises:
a resistor connected in series with the output of the resonant power converting circuit; and
a detecting circuit, coupled to two terminals of the resistor, for detecting the output current of the resonant converting circuit.

9. The resonant power converting circuit according to claim 3, wherein the resonant converting circuit is a series-parallel resonant convertor.

10. The resonant power converting circuit according to claim 3, wherein the control unit further outputs a second switching signal to the resonant converting unit, wherein a duty cycle of the first switching signal is substantially 50%, a duty cycle of the second switching signal is substantially 50%, wherein the waveforms of the first switching signal and the second switching signal are in anti-phase.

* * * * *